United States Patent [19]

Santo

[11] Patent Number: 5,520,063

[45] Date of Patent: May 28, 1996

[54] DISPLACEMENT MECHANISM FOR INSIDE REARVIEW MIRROR OF MOTOR VEHICLE

[75] Inventor: Antonio F. d. E. Santo, Sao Bernardo do Campo, Brazil

[73] Assignee: Metagal Industria e Comercio Ltda., Sao Paulo, Brazil

[21] Appl. No.: 237,180

[22] Filed: May 3, 1994

[51] Int. Cl.[6] .............................. A47G 1/24; B60R 1/04; G02B 5/08

[52] U.S. Cl. ...................... 74/97.1; 248/483; 248/549; 359/604

[58] Field of Search ................... 248/483, 484, 248/549; 359/604; 74/97.1

[56] References Cited

U.S. PATENT DOCUMENTS

| | | | |
|---|---|---|---|
| 4,822,140 | 4/1989 | Mittelhauser | 359/604 |
| 4,995,581 | 2/1991 | Koiwai et al. | 248/549 X |
| 5,016,979 | 5/1991 | Yoshino | 359/604 |

FOREIGN PATENT DOCUMENTS

| | | | |
|---|---|---|---|
| 52-59431 | 5/1977 | Japan | 359/604 |

Primary Examiner—Allan D. Herrmann
Attorney, Agent, or Firm—Michael J. Striker

[57] ABSTRACT

A displacement mechanism of a motor vehicle inside rearview mirror having a mirror plate mounted on the frame which is articulated on the lower end of a supporting arm having an upper end connected to an inside ceiling of the motor vehicle, the displacement mechanism comprises an axis provided in the lever, a transverse crankshaft supportable on the frame, a sphere provided on a lower end of the supporting arm, a trapezoidal plate having a smaller base which is turned downward and is coupled to an inside end of the axis, the trapezoidal plate having an intermediate region mounted on the transverse crankshaft, the trapezoidal plate having a central region provided for the sphere, the trapezoidal plate having an upper bigger base articulatable on the frame, the transverse crankshaft being somewhat resilient and including a longer intermediate segment which crosses transversely the trapezoidal plate and is articulated on it and short biased segments extending from ends of the intermediate segment and having end points which are parallel and not aligned to the intermediate segment and are supportable on the frame.

2 Claims, 2 Drawing Sheets 5,520,063

DISPLACEMENT MECHANISM FOR INSIDE REARVIEW MIRROR OF MOTOR VEHICLE

BACKGROUND OF THE INVENTION

The present invention relates to displacement mechanism for an inside rearview mirror of a motor vehicle.

Inside rearview mirrors of motor vehicles usually include a mirror plate mounted on a frame which is articulated with its upper end in an area of a vehicle inside ceiling and located at mid-level on an upper side of the windshield. The frame has a displacement mechanism which is intended to provide a small movement to the set in order to avoid glares which may dazzle the driver's visibility.

The displacement mechanism can be further improved in the sense of its construction and operation.

SUMMARY OF THE INVENTION

Accordingly, it is an object of the present invention to provide a displacement mechanism for an inside rearview mirror of a motor vehicle, which avoids the disadvantages of the prior art.

In keeping with these objects and with others which will become apparent hereinafter, one feature of the present invention resides, briefly stated, in a displacement mechanism for an inside rearview mirror of a motor vehicle, which has a trapezoidal plate with a smaller base turned downward and coupled to an inside end of an axle of a lever, an intermediate region mounted on a transverse crankshaft having ends bearing on supports of the frame, and a central region having a seat where a sphere is set and incorporated in the lower end of the supporting arm, while the bigger base of the plate is articulated on the mirror frame, and a transverse crankshaft is slightly resilient and has a longer intermediate segment which crosses transversely the plate where it is articulated and has ends from which short biased segments extend and have ends arranged parallel and not aligned to the intermediate segment supported on the supports of the frame.

When the displacement mechanism is designed in accordance with the present invention, it has an extremely simple and efficient construction, which is capable of properly meeting the expectations of a motor vehicle industry and consumers of its products.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
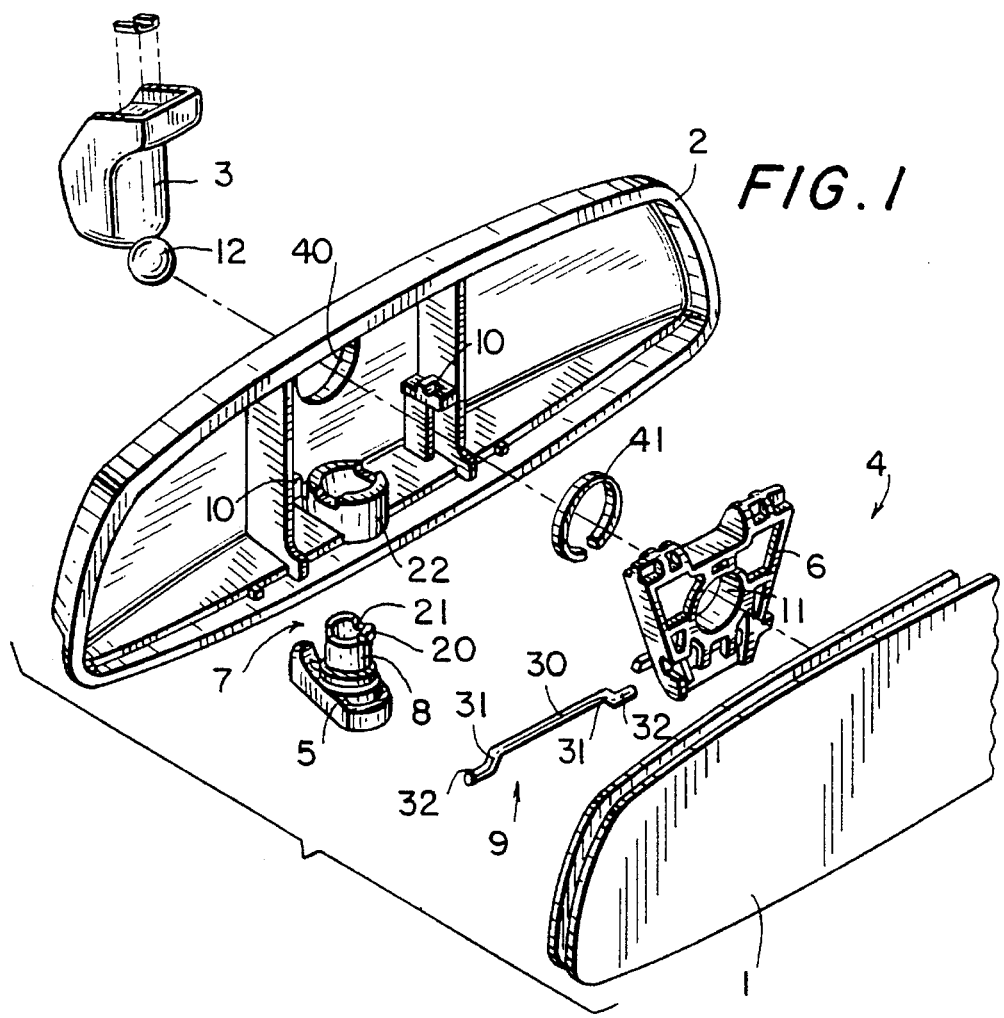
FIG. 1 is an exploded view of an inside rearview mirror for a motor vehicle with the displacement mechanism.
Figure 2:
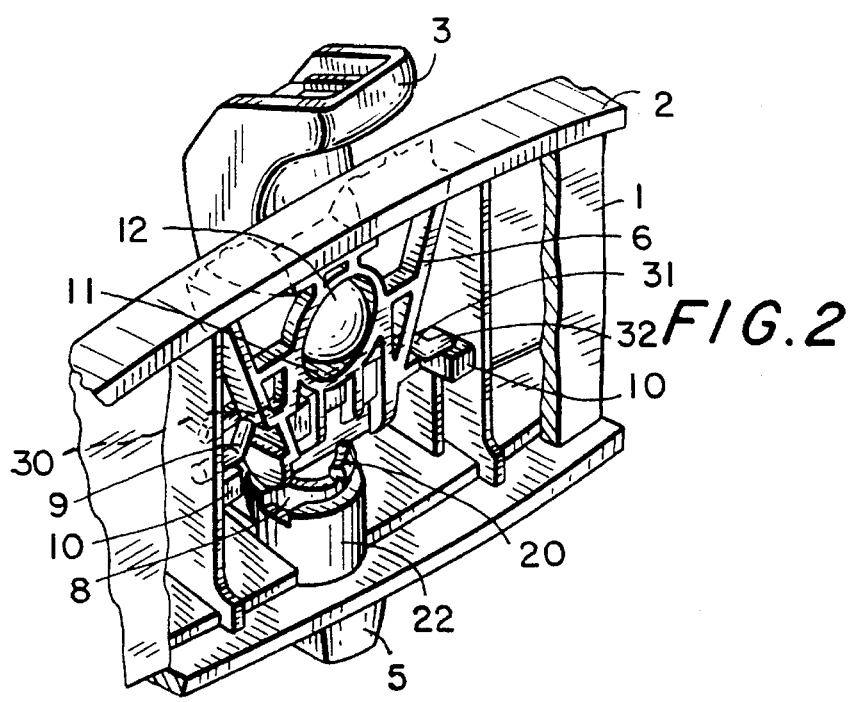
FIG. 2 is a view showing details of the assembled mirror with a partial cut, in which the displacement mechanism can be clearly seen.
Figure 3:
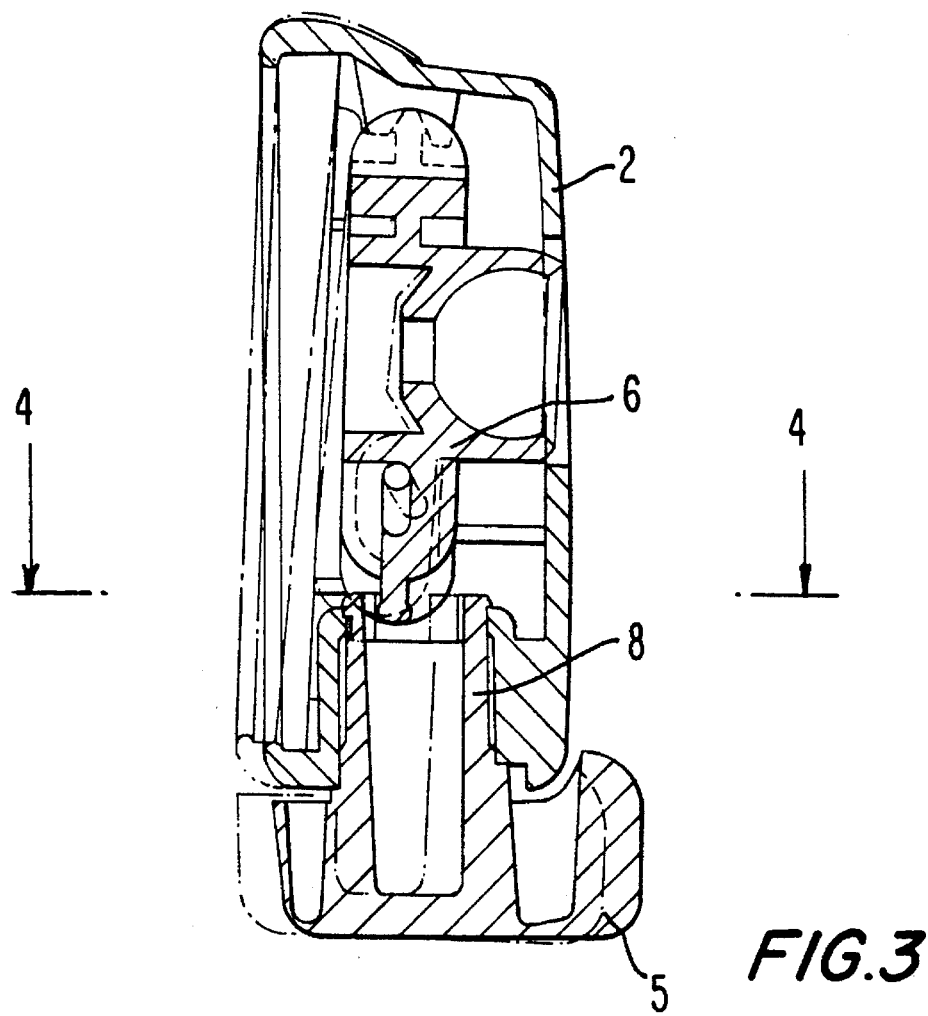
FIG. 3 is a view showing a vertical section of the displacement mechanism in accordance with the present invention, on an enlarged scale.
Figure 4:
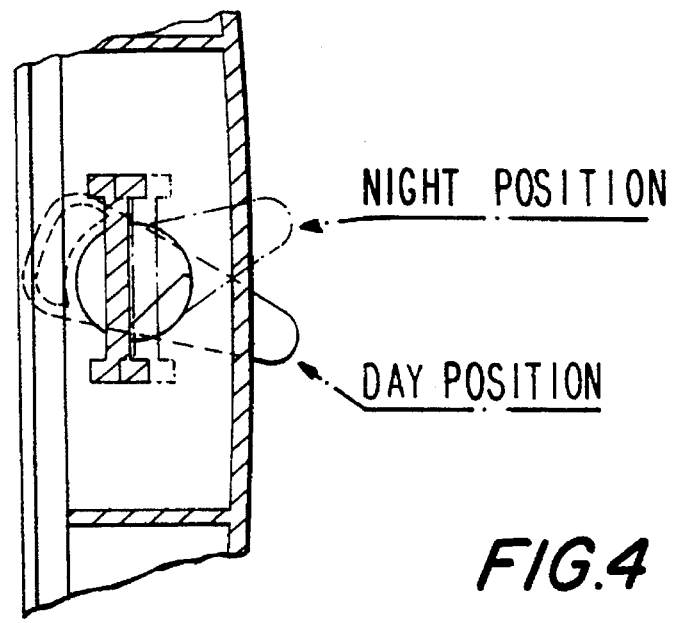
FIG. 4 is a view showing a section of the displacement mechanism of FIG. 3, taken along the lines IV—IV.

An inside rearview mirror for a motor vehicle has a usual mirror plate 1 which is mounted on a frame 2. The frame in turn is supported in an articulated manner on a lower end of a support arm 3. The upper end of the support arm is mounted in the region of the vehicle inside ceiling and located at a mid-level at the upper side of the windshield.

The frame 2 has a displacement mechanism 4 which is driven through a lever 5 on the lower side of the frame 2 and is capable of providing a small movement to the set in order to avoid dazzling of the vehicle driver.

The displacement mechanism 4 has a trapezoidal plate 6. The lower base 6a of the trapezoidal plate is turned downwards and is coupled to an inside end 7 of an axle 8 of the lever 5. The intermediate region 6b of the plate 6 is mounted on a transverse crankshaft 9, and the ends of the crankshaft bear on supports 10 of the frame 2. The central region 6c of the plate 6 has a seat 11 for a sphere 12 which is incorporated in the lower end of the supporting arm 3. The upper bigger base 6d of the plate 6 is articulated on the frame 2.

The inside end 7 of the axle 8 of the driving lever has an outside ferrule 20 provided with dragging indentations 21. The lower smaller base 6a of plate 6 is coupled with the indentations 21 of the ferrule 20. The central region of the axle 8 crosses the seat 22 of the lower face of the frame 2 and bears against the seat. The outside end of the axis 8 has the lever 5.

The transverse crankshaft 9 is formed of somewhat resilient metal. It includes a longer intermediate segment 30 which crosses transversely to the plate 6 where it is articulated. Short biased segments 31 extend from the ends of the intermediate segment 30 and have end points 32 which are parallel and not aligned to the intermediate segment 30. They are supported on the supports 10 of the frame 2.

The central seat 11 of the plate 6 is shaped as a ring with a spherical sector surface. The sphere 12 of the supporting arm 3 turns on the spherical sector surface. It is in line to an opening 40 surrounded by a ring 41 provided in the back of the frame 2.

When assembled, the trapezoidal plate 6 and the crankshaft 9 are coplanar, and the intermediate segment 30 is in a higher position and compressed, so as to provide a locking and improved stabilization of the mirror even when vibrations occur during motor vehicle travels. When the lever 5 is rotated, it pulls the lower smaller base 6a of the plate 6 and the crankshaft 9 so as to provide unlocking and abrupt movement of the set for the other position, and the stabilization of the latter.

It will be understood that each of the elements described above, or two or more together, may also find a useful application in other types of constructions differing from the types described above.

While the invention has been illustrated and described as embodied in a displacement mechanism for inside rearview mirror of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A displacement mechanism of a motor vehicle inside rearview mirror having a mirror plate mounted on a frame which is articulated on the lower end of a supporting arm having an upper end connected to an inside ceiling of the motor vehicle, the displacement mechanism comprising a lever provided with an axle; a transverse crankshaft supportable on the frame; a sphere provided on a lower end of the supporting arm; a trapezoidal plate having a smaller base which is turned downward and is coupled to an inside end of said axle, an intermediate region mounted on said transverse crankshaft, a central region provided for said sphere, and an upper bigger base articulatable on the frame, said transverse crankshaft being somewhat resilient and including a longer intermediate segment which crosses transversely said trapezoidal plate and is articulated on it and short biased segments extending from ends of said intermediate segment and having end points which are parallel and not aligned to said intermediate segment and are supportable on the frame.

2. A displacement mechanism as defined in claim 1; and further comprising supports provided on the frame, said transverse crankshaft having ends which bear on said supports, said short biased segments having end points which are supported on said supports.

* * * * *